Aug. 31, 1948.  H. M. MARTIN  2,448,381

DYNAMOELECTRIC MACHINE

Filed Dec. 18, 1944

Inventor:
Harold M. Martin,
by Harry E. Dunham
His Attorney.

Patented Aug. 31, 1948

2,448,381

UNITED STATES PATENT OFFICE 2,448,381

DYNAMOELECTRIC MACHINE

Harold M. Martin, Schenectady, N. Y., assignor to General Electric Company, a corporation of New York Application December 18, 1944, Serial No. 568,583

10 Claims. (Cl. 188—104)

My invention relates to dynamoelectric machines and more particularly to an improved inductor eddy current type machine in which slots are formed in the air gap surfaces of both members.

An object of my invention is to provide an improved inductor type dynamoelectric machine.

Another object of my invention is to provide an improved inductor type dynamoelectric machine having longitudinally extending slots in the air gap surfaces of both members of the machine with a slot-closing member formed as a squirrel cage winding in at least one of the relatively rotatable members of the machine and which is adapted to be cooled with cooling liquid supplied to the air gap of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
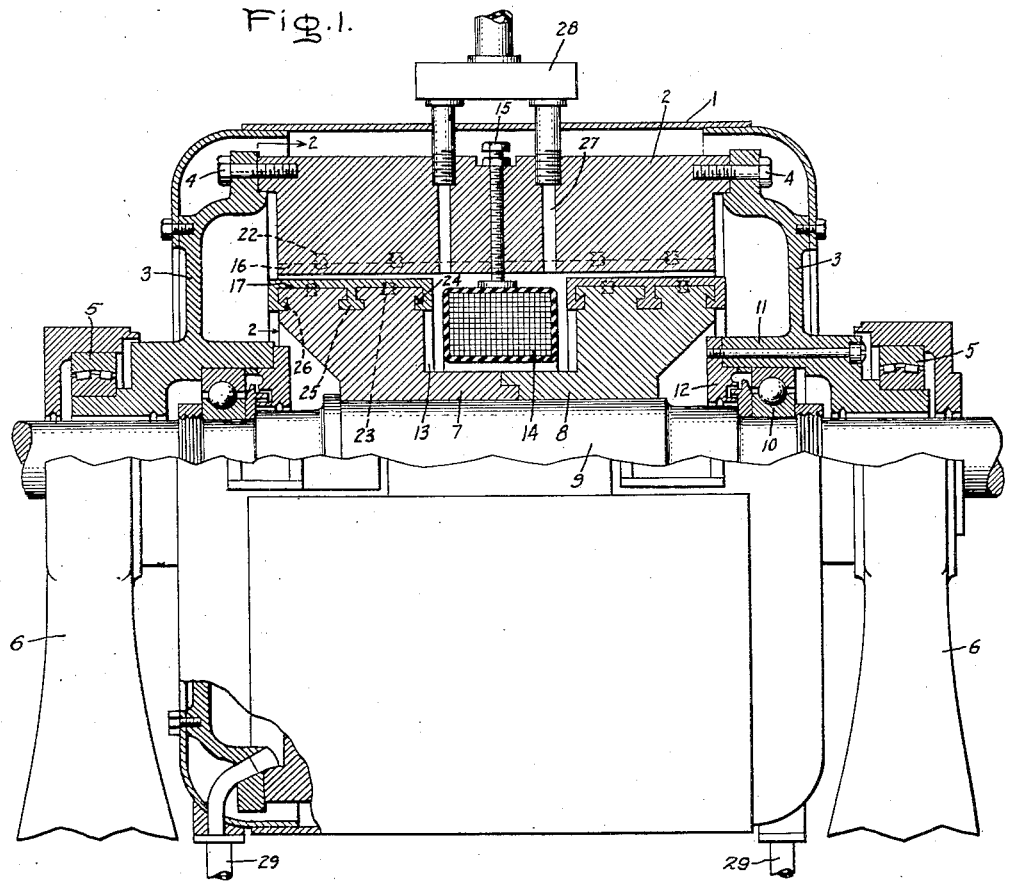
Figure 2:
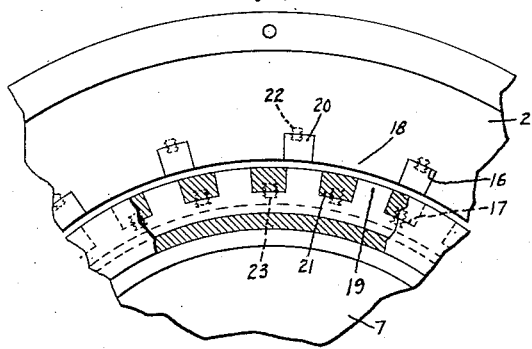

In the drawing, Fig. 1 is a side-elevational view, partly broken away, of a dynamoelectric machine provided with an embodiment of my invention; Fig. 2 is a partial end view of the air gap surfaces of the two relatively rotatable members of a machine such as that shown in Fig. 1 taken along line 2—2 of Fig. 1; and Fig. 3 is a partial sectional view through a slot of one of the relatively rotatable members of a machine illustrating another embodiment of my invention.

Referring to the drawing, I have shown an inductor eddy current type dynamoelectric machine which is adapted to be used as a dynamometer or brake and is provided with two substantially cylindrical members of magnetic material with an air gap therebetween. One of these two relatively rotatable members is formed as a substantially stationary member having an outer cover 1 arranged about a core 2 of magnetic material to which end shields 3 are secured in any suitable manner, as by bolts 4. The stationary member of the machine is adapted to be supported by the end shields 3 on suitable bearings, such as antifriction roller bearings 5 mounted in pedestals 6. Another relatively rotatable member is provided in the machine which is formed of a pair of complementary core members 7 and 8 of magnetic material which are mounted on a supporting shaft 9 in any suitable manner, as by a key or keys or a shrink or press fit thereon, and is rotatably supported by antifriction ball bearings 10 mounted in a bearing housing portion 11 of the end shields 3. Each of the end shields is provided with a labyrinth seal member 12 arranged on the inner side of the bearings 10 for minimizing the passage of foreign material, such as cooling liquid to the supporting bearings. In this construction, the relatively rotatable member is formed with a recess 13 intermediate the ends thereof for receiving an exciting winding 14 which is arranged in a watertight enclosure in the recess and is supported by suitable clamping and positioning bolts 15 on the stationary member of the machine. A plurality of longitudinally extending slots 16 and 17 in the stationary and rotatable members of the machine are formed in the air gap surfaces of these two members to provide flux concentrating poles or teeth 18 and 19, respectively, therebetween. The slots 16 and 17 are preferably closed with electrically conductive non-magnetic material members 20 and 21, respectively, which may be cast about roughened surface or threaded studs 22 and 23 secured in the bottoms of the slots 16 and 17 for anchoring the filling members in position. It is desirable that the slots of at least the higher speed of the two relatively rotatable members be thus filled in order to minimize turbulence in the cooling fluid which passes through the air gap of the machine. Furthermore, the capacity of the machine may be increased by the addition of short circuiting rings connecting together the filling members in the longitudinally extending slots. These short circuiting rings may be formed as shown in Fig. 1 and cast integral with the longitudinally extending filling members. In such a construction, the short circuiting rings may be cast into circumferentially extending anchoring openings which are formed with enlarged dovetail inner portions 24, 25, and 26 which are removed radially from the air gap surface of the machine. If this type short circuiting ring is used, the anchoring element 23 may be omitted, as the short circuiting ring will secure the ring and the longitudinally extending filling members in position in the form of a squirrel cage winding in the relatively high speed rotatable member. If the length of the longitudinally extending slots 17 is not too great, the intermediate anchoring groove 25 also may be omitted, as the short circuiting end rings may be found to be adequate for purposes of securing the filling members in position and also for providing the desired short circuiting of these members.

With this construction, the teeth in both members produce flux changes in the teeth of the other member, thus generating eddy currents in both of the members. In addition, the flux variation due to the relative movement of the teeth in the two members produces short circuit current in the squirrel cage winding formed in one or both of the members and produces further electrical losses in this squirrel cage winding. This electrical energy produces heat in the members which must be removed to prevent overheating of the machine and to provide for the maximum efficiency for absorbing power in this type device. In order to remove this heat energy, I provide passages 27 through the core 2 of the relatively stationary member to which a cooling liquid header 28 is suitably connected for supplying cooling liquid to the air gap between the two relatively rotatable members of the machine and around the field exciting winding 14 for cooling the field exciting winding and the portions of the two members adjacent the air gap. This cooling liquid passes into the recess 13 and into the air gap and axially out at the ends of the machine, cooling the air gap surfaces of the two members in this manner, and is removed from the machine through suitable drains 29. It is desirable that the torque pulsation in such a machine should be minimized, and this may be obtained by providing a different number of teeth in one of the members from the number of teeth in the other member, such as is shown in Fig. 2. With this type construction, maximum utilization of the material in the machine is provided and a minimum turbulence of the cooling liquid in the air gap is provided which minimizes the hydraulic drag on the machine.

Figure 3:
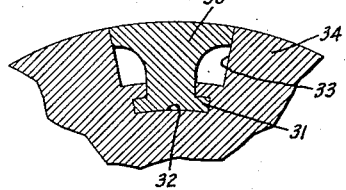

In Fig. 3, I have shown a further modification of the slot closing members which includes a closing member 30 having an inner enlarged dovetail portion 31 which is arranged in a complementary dovetail slot portion 32 which is removed from the air gap portion of a longitudinally extending slot 33 formed in the magnetic material core 34 of a relatively rotatable member of a machine such as that shown in Figs. 1 and 2. With this type construction, the member 30 is adapted to be driven into the slot 33, and the dovetail portion 31 secures it against displacement by centrifugal force. In addition, this construction does not require that the entire slot 33 be filled, and thereby provides a slighter weight machine and requires the use of smaller amount of filling material than in the other type construction if the anchoring portion 31 is not made larger than the unfilled portion of the slot. If the rotatable member is to be operated at relatively high speeds, this type slot filler may be found more suitable than the one shown in Figs. 1 and 2, as it is more securely held in position throughout its length and, if desirable, may have short circuiting rings mechanically and electrically attached at both ends.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An inductor eddy current type electrical machine having a pair of relatively rotatable members of magnetic material with an air gap therebetween, a plurality of slots in the magnetic material of both of said members adjacent said air gap, means including a field exciting winding for providing magnetic excitation to said magnetic material members and through said air gap, means substantially filling said slots with non-magnetic material for providing a substantially smooth surface to said relatively rotatable members adjacent said air gap, at least one of said slot filling means in one of said members being formed as a squirrel cage winding with short circuiting rings secured in enlarged anchoring openings in said magnetic material of said latter member and means for supplying liquid to said air gap intermediate the ends thereof for cooling the air gap surfaces of said member.

2. An electrical machine having a pair of relatively rotatable members of magnetic material with an air gap therebetween, a plurality of longitudinally extending slots in the magnetic material of both of said members adjacent said air gap, means including a field exciting winding for providing magnetic excitation to said magnetic material members and through said air gap, and means substantially closing said longitudinally extending slots with non-magnetic electrically conductive material for providing a substantially smooth surface to said relatively rotatable members adjacent said air gap, at least one of said slot closing means in one of said members being formed as a squirrel cage winding with short circuiting rings connected to said slot closing means.

3. An inductor eddy current type electrical machine having a pair of relatively rotatable members of magnetic material with an air gap therebetween, a plurality of slots in the air gap surface of the magnetic material of one of said members, a plurality of slots in the air gap surface of the other of said members different in number from those in said first mentioned member means including a field exciting winding for providing magnetic excitation to said magnetic material members and through said air gap, means substantially filling said slots with non-magnetic material for providing a substantially smooth surface to said relatively rotatable members adjacent said air gap, at least one of said slot filling means in one of said members being formed as a squirrel cage winding with short circuiting rings secured in anchoring openings in the magnetic material of said latter member, and means for supplying liquid to said air gap intermediate the ends thereof for cooling the air gap surfaces of said members.

4. An electrical machine having a pair of relatively rotatable members of magnetic material with an air gap therebetween, a plurality of longitudinally extending slots in the magnetic material of both of said members adjacent said air gap, means including a field exciting winding for providing magnetic excitation to said magnetic material members and through said air gap, means substantially closing said longitudinally extending slots with non-magnetic electrically conductive material for providing a substantially smooth surface to said relatively rotatable members adjacent said air gap, at least one of said slot closing means in one of said members being formed as a squirrel cage winding with short circuiting rings connected to said slot closing means, and means for supplying liquid to said air gap intermediate the ends thereof for cooling the air gap surfaces of said members.

5. An electrical machine having a relatively stationary member of magnetic material and a relatively rotatable member of magnetic material with an air gap therebetween, a plurality of slots in the air gap surface of the magnetic material of said relatively stationary member, a plurality of slots in the air gap surface of said relatively rotatable member different in number from those in said relatively stationary member, means including a field exciting winding for providing magnetic excitation to said magnetic material members and through said air gap, circumferentially extending anchoring slots in said relatively rotatable member removed radially from the air gap surface thereof at each end and at least one intermediate the ends thereof, means substantially filling said slots in both of said members with non-magnetic electrically conductive material for providing a substantially smooth surface thereto adjacent said air gap, and a short circuiting ring for said slot filling means at each end and intermediate the ends of said slots with an anchoring portion in said anchoring slots for securing said rings in position in said rotatable member.

6. An electrical machine having a relatively stationary member of magnetic material and a relatively rotatable member of magnetic material with an air gap therebetween, a plurality of longitudinally extending slots in the air gap surface of the magnetic material of said relatively stationary member, a plurality of longitudinally extending slots in the air gap surface of said relatively rotatable member different in number from those in said relatively stationary member, means including a field exciting winding for providing magnetic excitation to said magnetic material members and through said air gap, anchoring slots having enlarged inner portions in said relatively rotatable member removed radially from the air gap surface thereof at each end thereof, means substantially filling said longitudinally extending slots in both of said members with non-magnetic electrically conductive material for providing a substantially smooth surface thereto adjacent said air gap, and a short circuiting ring for said slot filling means at each end of said longitudinally extending slots with an anchoring portion in said anchoring slots for securing said rings in position in said rotatable member.

7. An electrical machine having a relatively stationary member of magnetic material and a relatively rotatable member of magnetic material with an air gap therebetween, a plurality of slots in the air gap surface of the magnetic material of said relatively stationary member, a plurality of slots in the air gap surface of said relatively rotatable member different in number from those in said relatively stationary member, means including a field exciting winding for providing magnetic excitation to said magnetic material members and through said air gap, anchoring enlarged slots in said relatively rotatable member removed radially from the air gap surface thereof at each end and at least one intermediate the ends thereof, means substantially filling said slots in both of said members with non-magnetic electrically conductive material for providing a substantially smooth surface thereto adjacent said air gap, a short circuiting ring for said slot filling means at each end and intermediate the ends of said slots with an anchoring portion in said anchoring slots for securing said rings in position in said rotatable member, and means for supplying liquid to said air gap intermediate the ends thereof and around said field exciting winding for cooling said field exciting winding and the air gap surfaces of said members.

8. An electrical machine having a relatively stationary member of magnetic material and a relatively rotatable member of magnetic material with an air gap therebetween, a plurality of longitudinally extending slots in the air gap surface of the magnetic material of said relatively stationary member, a plurality of longitudinally extending slots in the air gap surface of said relatively rotatable member different in number from those in said relatively stationary member, means including a field exciting winding for providing magnetic excitation to said magnetic material members and through said air gap, anchoring slots in said relatively rotatable member removed radially from the air gap surface thereof at each end thereof, means substantially filling said longitudinally extending slots in both of said members with non-magnetic electrically conductive material for providing a substantially smooth surface thereto adjacent said air gap, and a short circuiting ring for said slot filling means at each end of said longitudinally extending slots with an anchoring portion in said anchoring slots for securing said rings in position in said rotatable member, and means for supplying liquid to said air gap intermediate the ends thereof and around said field exciting winding for cooling said field exciting winding and the air gap surfaces of said members.

9. An electrical machine having a relatively stationary member of magnetic material and a relatively rotatable member of magnetic material with an air gap therebetween, a plurality of longitudinally extending slots in the air gap surface of the magnetic material of said relatively stationary member, a plurality of longitudinally extending slots in the air gap surface of said relatively rotatable member different in number from those in said relatively stationary member, means including a field exciting winding for providing magnetic excitation to said magnetic material members and through said air gap, circumferentially extending anchoring slots having enlarged dovetail inner portions in said relatively rotatable member removed radially from the air gap surface thereof at each end and at least one intermediate the ends thereof, means substantially closing said longitudinally extending slots in both of said members with non-magnetic electrically conductive material for providing a substantially smooth surface thereto adjacent said air gap, and a short circuiting ring for said slot closing means at each end and intermediate the ends of said longitudinally extending slots with an anchoring portion in said anchoring slots for securing said rings in position in said rotatable member, and means for supplying liquid to said air gap intermediate the ends thereof and around said field exciting winding for cooling said field exciting winding and the air gap surfaces of said members.

10. An inductor eddy current type electrical machine having a relatively stationary member of magnetic material and a relatively rotatable member of magnetic material with an air gap therebetween, a plurality of longitudinally extending slots in the air gap surface of the magnetic material of said relatively stationary member, means substantially closing said longitudinally extending slots in said stationary member with an electrically conductive non-magnetic material for providing a substantially smooth surface thereto adjacent said air gap, a plurality of longitudinally extending slots in the air gap surface of said relatively rotatable member different in number from those in said relatively stationary member, the teeth between the longitudinally extending slots in said stationary member being of a substantially greater width than the teeth between the longitudinally extending slots in said rotatable member, means substantially closing said longitudinally extending slots in said relatively rotatable members with an electrically conductive non-magnetic material for providing a substantially smooth surface thereto adjacent said air gap, a short circuiting ring for said last mentioned slot closing means and located at each end thereof and intermediate said ends, said short circuiting rings having an anchoring portion anchored in circumferentially extending anchoring slots for securing said rings in position in said rotatable member, means including a field exciting winding for providing magnetic excitation to said magnetic material members and through said air gap, and means for supplying liquid to said air gap intermediate the ends thereof and around said field exciting winding for cooling said field exciting winding and the air gap surfaces of said members.

HAROLD M. MARTIN.

REFERENCES CITED

The following references are of record in the file of this patent:

UNITED STATES PATENTS

| Number | Name | Date |
|---|---|---|
| 1,954,809 | Fraser | Apr. 17, 1934 |
| 2,351,963 | Hayes | June 20, 1944 |
| 2,372,590 | Ljunggren et al. | Mar. 27, 1945 |
| 2,407,504 | Martin | Sept. 10, 1946 |